United States Patent [19]

Cole, Jr.

[11] Patent Number: 4,970,518

[45] Date of Patent: Nov. 13, 1990

[54] AIR TRAFFIC CONTROL RADAR BEACON SYSTEM MULTIPATH REDUCTION APPARATUS AND METHOD

[75] Inventor: Elbert L. Cole, Jr., Catonsville, Md.

[73] Assignee: Westinghouse Electric Corp., Pittsburgh, Pa.

[21] Appl. No.: 280,910

[22] Filed: Dec. 7, 1988

[51] Int. Cl.$^5$ .................... G01S 13/76; G01S 13/91
[52] U.S. Cl. .................... 342/37; 342/39; 342/38
[58] Field of Search .................... 342/36–40, 342/32

[56] References Cited

U.S. PATENT DOCUMENTS

| | | | |
|---|---|---|---|
| 3,646,556 | 2/1972 | Bishop | 342/45 |
| 3,680,090 | 7/1972 | Bishop | 342/45 |
| 3,900,846 | 8/1975 | Gibbon et al. | 342/37 |
| 4,052,721 | 10/1977 | Ross | 342/30 |
| 4,060,805 | 11/1977 | McComas | 342/38 |
| 4,454,510 | 6/1984 | Crow | 342/32 |
| 4,656,477 | 4/1987 | Ronconi et al. | 342/39 |

Primary Examiner—Thomas H. Tarcza
Assistant Examiner—John B. Sotomayor
Attorney, Agent, or Firm—W. G. Sutcliff

[57] ABSTRACT

A system and method for detecting and removing specular multipath reports from terminal ATCRB systems for aircraft targets having Mode 3/A transponder reporting capabilities. Reports are delayed for a first time, or azimuth, interval to determine whether the report is multipath or to identify future occurrences of multipath reports. After the first azimuth interval, the report is released for display and a fragment of the report is retained for an additional azimuth interval. Of two reports with matching Mode 3/A code, the one with the greater range is considered to be a multipath reply. If the multipath report range falls within a multipath range interval and has not been released for display, it is discarded by the system as an erroneous report.

14 Claims, 4 Drawing Sheets

AIR TRAFFIC CONTROL RADAR BEACON SYSTEM MULTIPATH REDUCTION APPARATUS AND METHOD

BACKGROUND OF THE INVENTION

I. Field of the Invention

This invention relates to air traffic control radar beacon (ATCRB) systems and, more particularly, to a terminal ATCRB system for control of aircraft in the vicinity of an airport.

II. Description of the Related Art

Radar measures the distance to an object by measuring the time delay between the transmission of a RF (radio frequency) pulse, or radar signal, from the radar antenna and the reception of an echo of the RF pulse reflected by the object, usually an aircraft in flight. The bearing angle, or azimuth, of the aircraft is measured by the direction in which the radar antenna is pointing, or in the case of a steered beam, the direction in which the antenna is looking when the echo signal is received.

Terminal ATCRB systems are generally located in the vicinity of an airport and are used to control aircraft in the vicinity of the airport. Terminal ATCRB systems suffer from specular multipath signals caused by the presence of radar signal reflecting surfaces in the signal path.

Reflections occur from both permanent man-made structures such as hangars and water towers, and from transient structures such as the body, wings, tails, etc., of wide body aircraft. At a typical terminal radar installation there are less than 50 or these reflectors, and the majority are within 8 kilometers (km) of the radar antenna.

As shown by FIG. 1, a multipath reply signal has a longer RF path than a direct path reply signal from the target aircraft to the radar antenna. Such multipath reply signals frequently garble or interfere with the direct path reply signal.

The multiple reflections experienced by a multipath reply signal reduces its power level compared to the direct path reply signal. This power level difference has been exploited with moderate success by various fixed and adaptive threshold multipath reduction techniques when garbling of the direct path reply is occurring. However, the multipath reply frequently does not interfere with the direct path reply, such as where the multipath occurs in the clear and possibly offset in angle from the direct path reply.

A multipath reply signal occurring at an offset angle from the direct path reply signal results in a "ghost," or an aircraft reported by the radar system at a bearing angle and distance where no actual aircraft exists. Ghost reports can cause considerable difficulty for both air traffic controllers and air traffic control (ATC) computer systems in determining which of the two or more reports of an aircraft is the actual aircraft?

It is an object of the present invention to detect and eliminate airport ATCRB system ghost reports for transponder equipped aircraft.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a method of eliminating specular multipath target reports from an air traffic control system radar displaying azimuth, range, and target identification is provided, comprising the steps of: storing received radar reports for a predetermine time interval corresponding to an angle in azimuth, detecting successive reports corresponding to stored reports having the same target identification, comparing the range of each detected report with the corresponding stored report, eliminating one of the detected successive reports and the corresponding stored re port in accordance with the compared range, and displaying the stored reports not eliminated by the eliminating step.

It is also preferable that an apparatus be provided for eliminating specular multipath aircraft reports from an airport terminal air traffic control radar beacon system which provides range, azimuth, and transponder code reports of aircraft.

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Figure 1:
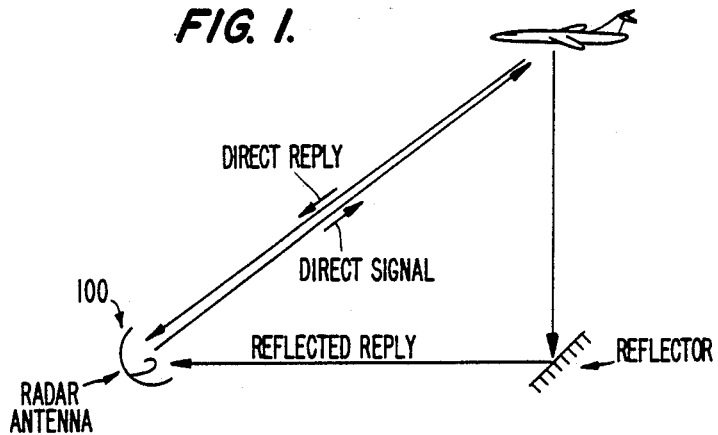
FIG. 1 is a diagram generally showing the signal path taken by specular multipath radar signal reflections.

Reference will now be made in detail to the present preferred embodiment of the invention as illustrated in the accompanying drawings. Identical components are identified by the same reference numeral in each figure.

Figure 2:
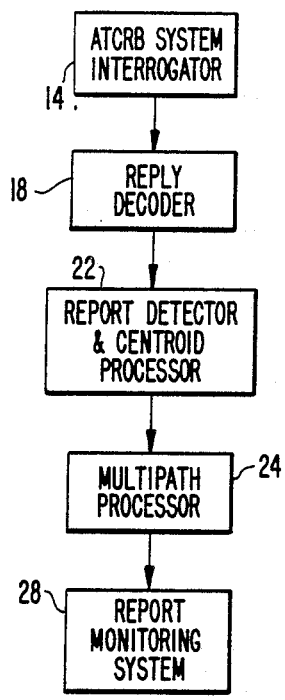
FIG. 2 is a block diagram of an ATCRB system signal processing apparatus.

As shown in FIG. 2, an ATCRB system 10 comprises an ATCRB system interrogator 14, a reply decoder 18, a report detector and centroid processor 22, a multipath processor 24, and a report monitoring system 28. Output from system interrogator 14 is input to decoder 18.

Output from decoder 18 is input to report detector and centroid processor 22. The output of processor 22 is input to multipath processor 24, and the output of multipath processor 24 is provided to report monitoring system 28.

The functions of reply decoder 18, report detector and centroid processor 22, multipath processor 24 and report monitoring system 28 may be performed by discrete circuits or computer systems, known to those of skill in the art, but configured to practice the invention as described herein.

A radar transmitter in interrogator 14 sends radar signals to a target and receives echo signals reflected from the target which in this case is an aircraft. Included in the radar signals sent to the target are radar transponder interrogation signals that cause a transponder in the aircraft to transmit interrogation reply signals containing a discrete Mode 3/A transponder code which is received by the radar system along with the echo signal from the target aircraft.

Decoder 18 extracts the Mode 3/A code from the interrogation reply. Report detector and centroid processor 22 determines, based on a number of received echo signals, the azimuth and range of the aircraft. Azimuth is determined by the angle at which the radar antenna is pointing when the echo signal is received, and range is determined by measuring the time delay between transmission of the radar signal and reception of the echo signal. Radar signals travel roughly one nautical mile (nm) in six microseconds (usec.). If the radar signal is reflected from an object while the signal is on its way to or from the aircraft, the signal path length is extended, and hence the time for the signal to travel from the antenna to the aircraft and back to the antenna is increased, giving a false range and azimuth to the target. The reflection is called a specular multipath reflection, and the resulting false aircraft report is commonly termed a "ghost."

Figure 3A:
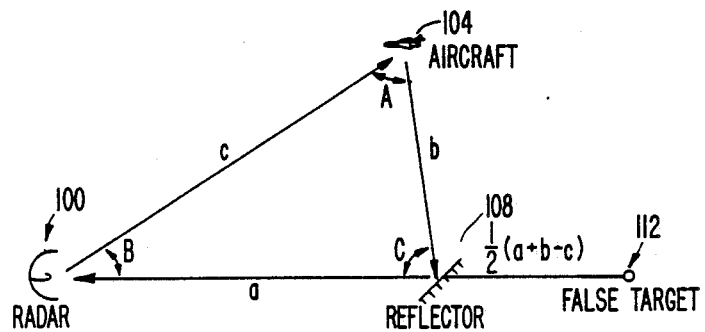
FIG. 3a is a diagram showing the signal path of a reflected reply.

A reflected reply is shown in FIG. 3a. Assuming an interrogation signal transmitted from radar antenna 100 travels to aircraft 104 over path c, part of the reply signal returns from aircraft 104 to reflector 108 over path b and then back to antenna 100 over path a. As a result of the reflection, a false target report (ghost) 112 occurs at the azimuth of the reflector and at a range of $0.5^*(a+b+c)$. The difference between the range to aircraft 104 and ghost 112 is $0.5^*(a+b-c)$.

Figure 3B:
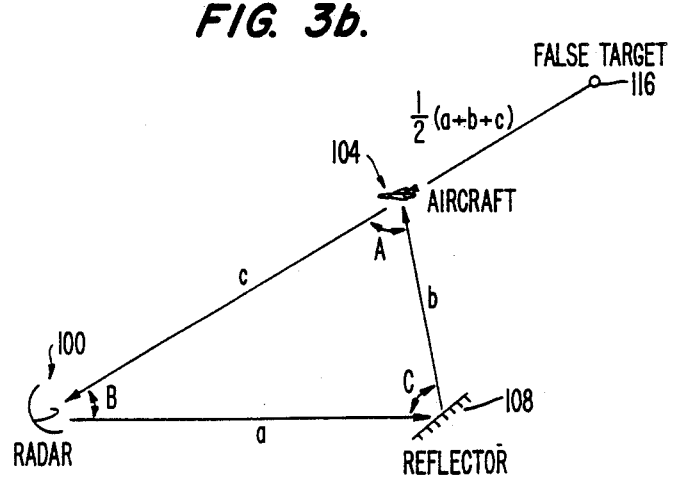
FIG. 3b is a diagram showing the signal path of a reflected interrogation.

A reflected interrogation is shown in FIG. 3b. Assuming an interrogation signal transmitted from radar antenna 100 travels to reflector 108 over path a and is then reflected to aircraft 104 over path b, the reply signal then returns from aircraft 104 to antenna 100 over path c. The reflected interrogation results in ghost 116 at the azimuth of aircraft 104 but at a range of $0.5^*(a+b+c)$. The difference in range between aircraft 104 and ghost 116 is $0.5^*(a+b-c)$.

Figure 4:
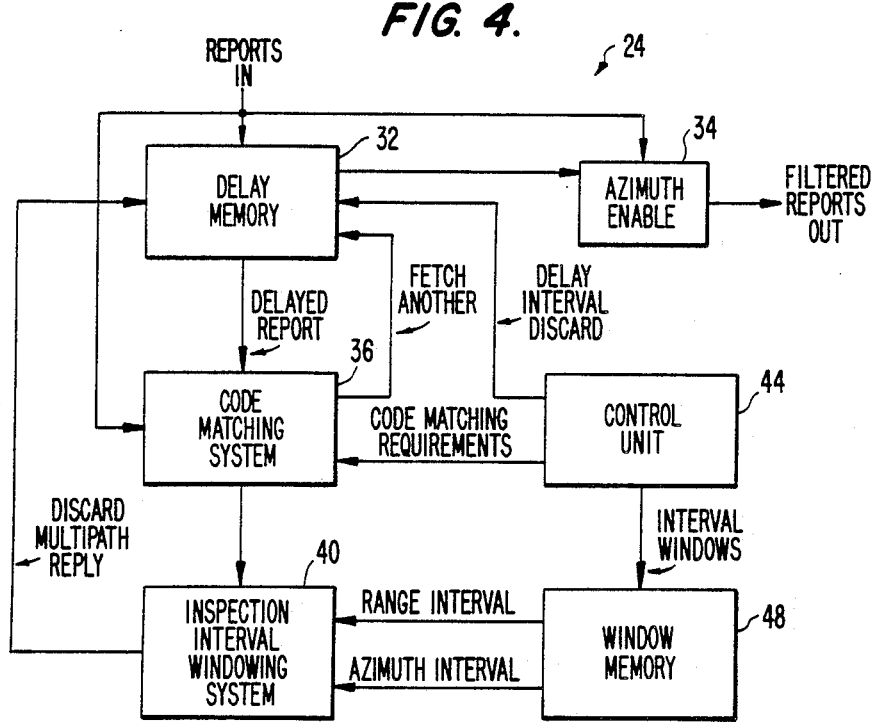
FIG. 4 is a block diagram of an apparatus for eliminating specular multipath reflections, incorporating the teachings of the present invention.

In accordance with the invention, a method is provided for eliminating specular multipath aircraft, or ghost, reports from airport terminal air traffic control radar beacon systems which provide range, azimuth, and transponder code reports of aircraft. As shown in FIG. 4 by way of example and not as a limitation, multipath processor 24, comprising delay memory 32, azimuth enable system 34, code matching system 36, inspection interval window system 40, control unit 44 and window memory 48 eliminates such ghost reports.

Delay memory 32 is connected to report detector and centroid processor 22, azimuth enable system 34, code matching system 36, inspection interval window system 40, control unit 44 and report monitoring system 28. Code matching system 36 is connected to delay memory 32, inspection interval window system 40, and control unit 44. Inspection interval window system 40 is connected to delay memory 32, code matching system 36 and window memory 48. Control unit 44 is connected to delay memory 32, code matching system 36 and window memory 48. Window memory 48 is connected to control unit 44 and inspection interval window system 40.

Multipath processor 24 intercepts all target reports from centroid processor 22 and performs an editing operation to provide a filtered target report output to monitoring system 28. Multipath reports are identified by processor 24 and are discarded.

Delay memory 32 stores received radar reports for a predetermined time interval corresponding to an angle in azimuth. The reports received from report detector and centroid processor 22 comprise range, azimuth and Mode 3/A code for each target detected by ATCRB system 10. The reports may also contain Mode C information. The target report may be either a real aircraft report or a ghost report. If a report remains in memory 32 for a first time period, also measured as a first azimuth interval, the report is copied from memory 32 to the ATCRB system monitoring system for further processing and eventual visual display for the information of an air traffic controller, however, the report also remains in memory 32. Control unit 44 directs memory unit 32 to discard any report that has been stored in memory 32 for longer than a second time interval, also measured as a second azimuth interval.

The first time interval, measured by control unit 44, is the maximum allowed delay time for reports to be held for ghost elimination before being passed on for display. This time interval is actually measured as an azimuth interval, and in the preferred embodiment of the invention, this first azimuth interval, called the inspection interval, is 11.25°. That is, the report may be delayed for the time equivalent to system 10 scanning a region 11.25° beyond the azimuth where the report was received. The inspection interval is established by Federal Aviation Regulations, but may be set to any value permitted by required system performance. The inspection interval is, therefore, the amount of degrees that a report may be delayed before it must be sent to system monitor 28 for display.

The second time interval, also measured by control unit 44, is the maximum amount of time, as measured in degrees azimuth, that a report will be retained in memory for comparison with incoming reports to determine if the new reports are ghosts or real aircraft. This second azimuth interval is set to 44.25° in the preferred embodiment to limit the amount of memory required to hold reports and includes the first time interval of 11.25°. An interval of 44.25° has been found empirically to provide an optimum compromise between cost and probability of detecting ghost reports, and may be varied substantially without appreciably affecting performance of the overall system.

Code matching system 36 detects successive reports corresponding to stored reports having the same target identification. This is accomplished by matching the Mode 3/A code of each new report, called the latest report, with the Mode 3/A code of each report stored in memory 32 (except the new report). Mode 3/A codes are assigned to aircraft by ATC. In the absence of an error, the code for each aircraft will be unique, except during brief transients when the pilot of an aircraft alters his Mode 3/A code and "passes through" another aircraft's assigned code. If a code match is found, there is a high probability that one of the reports is a ghost report of the same aircraft.

The matching report, called a prior matching report, and the latest report are then passed to inspection interval window processor 40. Window processor 40 decides whether one of the reports is a ghost, and if so, which report to discard. Alternatively, code matching system 36 may be directed by control unit 44 to declare a match based a Mode 3/A code match and on a non-discrete Mode C interrogation response code match or when codes match to within one data bit.

Most reflectors of ATCRB system terminal radar signals occur at a range of 8 kilometers (4.32 nm) or less from the radar antenna. In the preferred embodiment of the invention, path a of FIGS. 3a and 3b is assumed to be fixed at a maximum distance of 4.32 nm. As previously discussed, air traffic control regulations limit the inspection interval azimuth angle during which a report may be delayed for ghost detection to 11.25°. Given these constraints, path b for various aircraft ranges may be calculated by application of the law of cosines:

$$b^2 = a^2 + c^2 - 2\,a\,c\,\cos(B), \text{ where}$$

$a = 4.32$ nm (*max*), and
$B = 11.25°$.

Once b is known, the signal path length to the ghost may be calculated and the difference between the ghost path length and the aircraft path length may be calculated. This path length difference is called the multipath range interval and is the range interval over which multipath reports of the true target (aircraft) can occur. These values are listed in Table 1 for various aircraft path lengths in nm. Range is one half the path length.

TABLE 1

| Aircraft Path (2c) | Path c | Path a | Path b | Ghost Path (a + b + c) | Multipath Range Interval (a + b − c) |
|---|---|---|---|---|---|
| 5 | 2.5 | 4.32 | 1.14 | 7.96 | 2.96 |
| 10 | 5.0 | 4.32 | 5.8 | 15.12 | 5.12 |
| 20 | 10.0 | 4.32 | 15.8 | 30.12 | 10.12 |
| 30 | 15.0 | 4.32 | 25.8 | 45.12 | 15.12 |
| 40 | 20.0 | 4.32 | 35.8 | 60.12 | 20.12 |
| 50 | 25.0 | 4.32 | 45.8 | 75.12 | 25.12 |
| 60 | 30.0 | 4.32 | 55.8 | 90.12 | 30.12 |

The maximum path length for terminal ATCRB system radars is 60 nm, therefore, a multipath range interval of 20.12 nm is sufficient to cover all ghost reports based on the design assumptions. The multipath range interval may be calculated by control unit 44 for each report, based on the reported range, or it may be stored in window memory 48 and be treated as a window for a band of reported ranges. The window method reduces system processing time requirements, but either method of passing a multipath range interval to window processor 40 is acceptable.

In accordance with the invention, the range of each detected report is compared with the corresponding stored report. Window processor 40 compares the latest report range, called the latest range, to the prior matching report range, called the prior range. The report with the greatest range is assumed to be a ghost report, and the report with the shortest range is assumed to be a real report. The two reports are processed by window processor 40 to determine if one of the reports is in fact a ghost, and to discard the ghost report from memory 32 if the report has not yet been passed to monitoring system 28.

FIGS. 5a–5d show polar plots 200-212 of first azimuth, or inspection, interval 216 of 11.25°, second azimuth interval 220 of 44.25°, which includes first azimuth interval 216, ghost report 224 and real report 228. Time and azimuth are increasing in the counterclockwise direction as viewed in FIGS. 5a–5d.

The operation of multipath processor 24 will now be discussed with reference to FIGS. 5a–5d and flowchart 300 of FIG. 6. As shown in FIG. 6, multipath processor 24 receives reports, including a prior report and a latest report, from report detector and centroid processor 22, step 304. All reports are delayed and stored in delay memory 32, step 308. The Mode 3/A code of the latest report received by multipath processor 24 is compared by code matching system 36 with the Mode 3/A codes of all previously received and stored reports, step 312. If the codes match, the latest report and the prior matching report are passed to inspection interval windowing system 40, step 316. If the codes do not match, the next report stored in memory 32 is retrieved for matching, step 320.

Figure 5A:
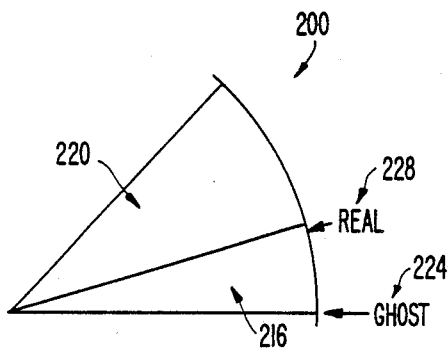
FIG. 5a is an azimuth diagram showing a specular multipath reflection signal preceding a direct signal from an aircraft within a first azimuth interval.
Figure 6:
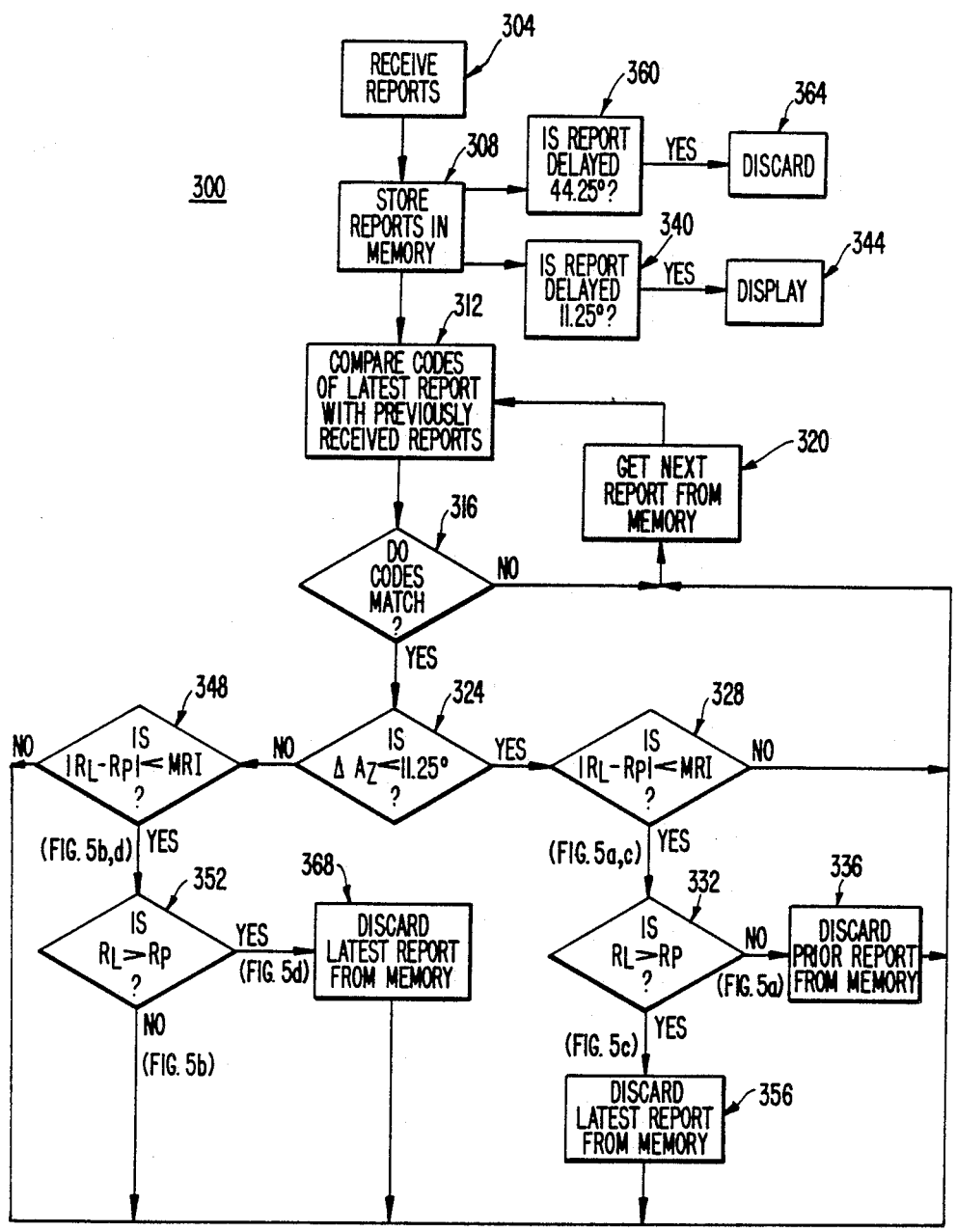
FIG. 6 is a flowchart showing the operation of the multipath processor of FIG. 4.

FIG. 5a shows the case where assumed ghost (i.e., prior) report 224 occurs prior in time and within 11.25° of real (latest) report 228. Window processor 40, in step 324 of flowchart 300, compares the latest report azimuth, called the latest azimuth, to the prior report azimuth, called the prior azimuth, and determines that both reports are within the first azimuth interval, therefore both reports remain in memory 32, and neither has been passed to monitoring system 28. The multipath range interval (MRI), shown in Table 1, is now compared in step 328 to the difference between the latest and prior ranges. If the difference falls within the multipath range interval associated with the real report range, or path, the assumed ghost report meets the range and azimuth window requirements and is confirmed to be a ghost. Of the two reports, report 224 is determined in step 332 to be the ghost report because of its greater range. Window processor 40 then directs delay memory 32 to discard the ghost report in step 336 prior to its being passed to monitoring system 28.

If the assumed ghost report had been outside the multipath range interval in step 328, the assumed ghost report would not have been confirmed as a ghost and would have been retained for eventual display at the end of first azimuth interval 216. An assumed ghost report outside the expected range is not confirmed by system 24 as a ghost because the report could in fact be the result of an erroneously assigned Mode 3/A code.

Figure 5B:
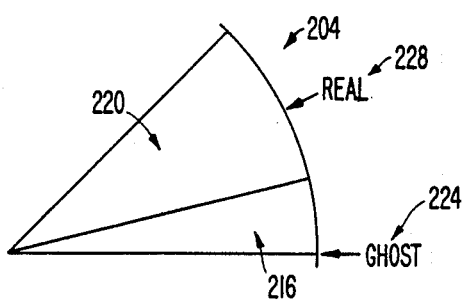
FIG. 5b is an azimuth diagram showing a specular multipath reflection signal preceding a direct signal from an aircraft within a second azimuth interval.

FIG. 5b shows the case where assumed ghost (prior) report 224 occurs prior in time and outside first azimuth interval 216, as determined by window processor 40, in step 324, but within the second azimuth interval. In this case, ghost report 224, confirmed in steps 348 and 352, has already been passed to monitoring system 28 in steps 340 and 344 by control unit 44 of FIG. 4, therefore there is no need to direct memory 32 to discard the report. Real (latest) report 228 is also retained for eventual display after 11.25° delay.

Figure 5C:
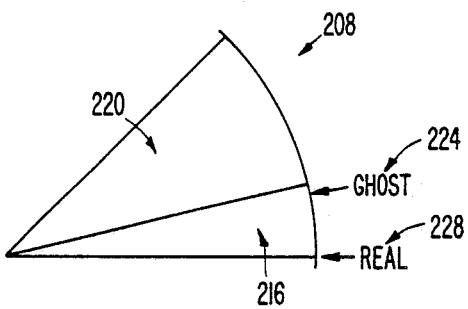
FIG. 5c is an azimuth diagram showing a specular multipath reflection signal following a direct signal from an aircraft within a first azimuth interval.

FIG. 5c shows the case where real (prior) report 228 precedes assumed ghost (latest) report 224 by less than the first azimuth interval. As in the case of FIG. 5a, window processor 40 determines whether both reports are within the first azimuth interval in step 324, and whether the difference of the ranges is within the multipath range interval in step 328. If the answer is yes, assumed ghost report 224 is confirmed in step 332 to be the ghost report, as compared to real report 228, and report 224 is discarded in step 356. If ghost report 224 is not confirmed in step 328, neither report is discarded.

Figure 5D:
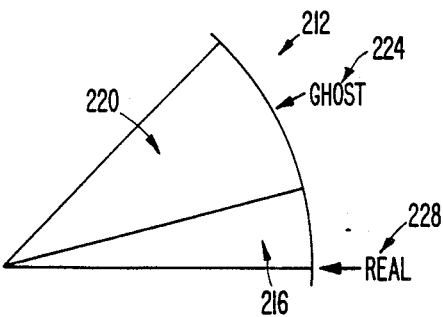
FIG. 5d is an azimuth diagram showing a specular multipath reflection signal following a direct signal from an aircraft within a second azimuth interval.

FIG. 5d shows the situation, similar to that of FIG. 5c, where assumed ghost (latest) report 224 follows real (prior) report 228, however, the first azimuth interval has been exceeded, as determined in step 324 when report 224 is received, thus, real report 228 has already been passed to monitoring system 40 in steps 340 and 344. Report 228 remains in memory 32 because all reports are retained for the duration of the second azimuth interval unless discarded as ghost reports by window processor 40. All reports received and stored by multipath processor 26 subsequent to the arrival of report 228, and prior to control unit 44 directing memory 32 to erase report 228 at the end of the second azimuth interval 220 in steps 360 and 364, will be compared to report 228 by code matching system 36. Thus, a ghost for report 228 occurring at any time within the second azimuth interval will be detected and discarded in step 368 prior to being reported.

If an actual ghost report is received after real report 228 and outside second azimuth interval 220, report 228 will no longer be stored in memory 32, and will, therefore, be unavailable to code matching system 36. The actual ghost report will eventually be passed to monitoring system 28 for display in steps 340 and 344.

Azimuth enable system 34 permits the multipath elimination features of system 24 to be switched off as a function of the azimuth of radar antenna 100. When system 10 is directed toward an area that is known to not produce ghost reports, that is, there are no fixed or transient objects available to reflect the incoming and outgoing radar signals, the multipath processor 24 may be bypassed to reduce the workload on the system and save processing time.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of applicant's general inventive concept.

What is claimed is:

1. A method of eliminating specular multipath target reports from an air traffic control system radar displaying azimuth, range, and target identification, comprising the steps of:
   storing received radar reports for first and second portions of a predetermined time interval corresponding to first and second angles in azimuth;
   detecting successive reports corresponding to stored reports having the same target identification;
   comparing the range of each detected report with the corresponding stored report;
   eliminating the report having the greater range at times when a detected successive report and the corresponding stored report are both received in the first portion of the predetermined time interval and the difference between the ranges of the successive detected report and the corresponding stored report is less than a predetermined value;
   eliminating the successive detected report at times when the successive detected report and the corresponding stored report are both received within the second portion of the predetermined time interval and the range of the successive detected report is greater than the range of the corresponding stored report; and
   displaying the stored reports not eliminated by the eliminating step.

2. An apparatus for eliminating specular multipath target reports from an air traffic control radar system displaying azimuth, range, and target identification, comprising:
   means for storing received radar reports for first and second portions of a predetermined time interval corresponding to first and second angles in azimuth;
   means for detecting successive reports corresponding to stored reports having the same target identification;
   means for comparing the range of each detected report with the corresponding stored report;
   means for eliminating the report having the greater range at times when a detected successive report and the corresponding stored report are both received in the first portion of a predetermined time interval and the difference between the ranges of the successive detected report and the corresponding stored report is less than a predetermined value;
   means for eliminating the successive detected report at times when the successive detected report and the corresponding stored report are both received within the second portion of the predetermined time interval and the range of the successive detected report is greater than the range of the corresponding stored report; and
   means for displaying the stored reports not eliminated by the eliminating means.

3. An apparatus for eliminating specular multipath aircraft reports from an airport terminal air traffic control radar beacon system which provides range, azimuth, and transponder code reports of aircraft, said apparatus comprising:
   delay memory means for storing a plurality of reports from the radar system;
   control means having multipath range intervals, a first azimuth interval and a second azimuth interval, for directing said delay memory means to output each of said reports remaining in said delay memory means to a report monitoring system when said each report has been stored for a duration equal to said first azimuth interval and for discarding said each report when said each report has been stored for a duration equal to said second azimuth interval;
   code matching means for comparing each of the reports in said delay memory means to the most recently received one of the reports, called a latest report, and for providing a code match signal when the code in said latest report matches the code of one of said stored reports, called a prior report; and
   inspection means, responsive to said code matching means and said control means, for directing said delay memory means to discard said latest report when the range of said latest report, called the latest range, is greater than the range of said prior report, called the prior range, at times when the difference between said latest and prior ranges is less than or equal to a selected one of said multipath range intervals, and when the difference between the azimuth of said latest report, called the latest azimuth, and the azimuth of said prior report, called the prior azimuth, is less than or equal to said first azimuth interval, and for directing said delay memory means to discard said prior report when said latest range is less than said prior range, at times when the difference between said latest and prior ranges is less than or equal to a selected one of said multipath range intervals, and when the difference between said latest azimuth and said prior azimuth is less than or equal to said first azimuth interval.

4. The apparatus of claim 3 wherein said control means includes means for specifying code match parameters to said code matching means.

5. The apparatus of claim 4 wherein said code match parameter directs said code matching means to match Mode 3/A transponder codes.

6. The apparatus of claim 4 wherein said code match parameter directs said code matching means to match non-discrete transponder modes.

7. The apparatus of claim 4 further including a window memory, coupled between said control means and said inspection means, for storing and providing to said inspection means, said multipath range intervals, said first azimuth interval, and said second azimuth interval.

8. The apparatus of claim 3 wherein said delay memory means stores only a portion of said reports during the period of said second azimuth interval following said first azimuth interval.

9. The apparatus of claim 3 further comprising means for enabling the elimination of specular multipath aircraft reports when said radar beacon system is pointing in directions known to cause multipath reports and for disabling the elimination of specular multipath aircraft reports when said radar beacon system is pointing in directions known to be free of multipath reports.

10. A method for eliminating specular multipath aircraft reports from an airport terminal air traffic control radar beacon system which provides range, azimuth, and transponder code reports of aircraft, comprising the steps of:

storing a plurality of reports from the radar system in a delay memory means;

controlling said delay memory means to output each of said reports remaining in said delay memory means to a report monitoring system when said each report has been stored for a duration equal to a first azimuth interval and for discarding said each report when said each report has been stored for a duration equal to a second azimuth interval;

comparing each of the reports in said delay memory means to the most recently received one of the reports, called a latest report, and for providing a code match signal when the code in said latest report matches the code of a matching one of said stored reports, called a prior report; and directing said delay memory means to discard said latest report when the range of said latest report, called the latest range, is greater than the range of said prior report, called the prior range, when the difference between said latest and prior ranges is less than or equal to a selected multipath range interval, and when the difference between the azimuth of said latest report, called the latest azimuth, and the azimuth of said prior report, called the prior azimuth, is less than or equal to said first azimuth interval, and for directing said delay memory means to discard said prior report when said latest range is less than said prior range, when the difference between said latest and prior ranges is less than or equal to a selected multipath range interval, and when the difference between said latest azimuth and said prior azimuth is less than or equal to said first azimuth interval.

11. The method of claim 10 wherein said step of comparing includes matching Mode 3/A transponder codes.

12. The method of claim 10 wherein said step of comparing includes matching non-discrete transponder modes.

13. The method of claim 10 wherein said step of storing includes storing only a portion of said reports during the period of said second azimuth interval following said first azimuth interval.

14. The method of claim 10 further comprising a step of enabling the elimination of specular multipath aircraft reports when said radar beacon system is pointing in directions known to cause multipath reports and disabling the elimination of specular multipath aircraft reports when said radar beacon system is pointing in directions known to be free of multipath reports.

* * * * *